United States Patent [19]

Chernuchin et al.

[11] Patent Number: 5,063,615
[45] Date of Patent: Nov. 12, 1991

[54] COEXTRUDED PLASTIC BELT STRAP, BUCKLE AND BELT

[75] Inventors: Michael Chernuchin, New York, N.Y.; Richard Satin, Swampscott, Mass.

[73] Assignee: Fashion Technologies, Inc., Waltham, Mass.

[21] Appl. No.: 572,479

[22] Filed: Aug. 24, 1990

Related U.S. Application Data

[60] Continuation-in-part of Ser. No. 464,947, Jan. 16, 1990, which is a division of Ser. No. 276,677, Nov. 28, 1988, Pat. No. 4,912,828.

[51] Int. Cl.$^5$ .......................... A41F 3/02; A41F 9/00; A41F 15/00
[52] U.S. Cl. .......................... 2/338; 2/336; 2/311; 2/322; 2/321; 2/328; 2/DIG. 2; 2/301; 24/163 K
[58] Field of Search .................. 2/338, 321, 322, 301, 2/DIG. 2, 308, 311, 323, 326, 329, 336; 24/163 K, 200, 169, 168; 264/171

[56] References Cited

U.S. PATENT DOCUMENTS

| 984,570 | 2/1911 | Kuhn | 2/301 |
|---|---|---|---|
| 2,939,151 | 6/1960 | Cuttler | 2/338 X |
| 2,941,914 | 6/1960 | Ouimet | 2/338 |
| 3,013,919 | 12/1961 | Bialy | 2/338 |
| 3,062,533 | 3/1962 | Zakarin | 2/301 |
| 3,411,161 | 11/1968 | Meeker | 2/301 |
| 3,530,031 | 9/1970 | Loew | 2/338 X |
| 3,544,408 | 12/1970 | Loew | 2/338 X |
| 4,077,091 | 3/1978 | Liljedahl | 24/198 |
| 4,912,828 | 4/1990 | Chernuchin et al. | 29/434 |

FOREIGN PATENT DOCUMENTS 1159017  8/1956  France ........................... 2/301

*Primary Examiner*—Werner H. Schroeder
*Assistant Examiner*—Bibhu Mohanty
*Attorney, Agent, or Firm*—Amster, Rothstein & Ebenstein

[57] ABSTRACT

A finished belt simulating a leather belt has in combination a finished belt strap and a finished buckle. The finished belt strap includes an unfinished molded plastic strap having a thin plastic front layer of light color and a continuous relatively thick plastic back layer of relatively dark color, and a film of finish disposed on the exposed surface of the strap front layer. The finished belt buckle includes an unfinished coextruded molded plastic buckle having a thick flexible plastic front layer of light color and a relatively thin rigid plastic back layer of relatively dark color, and a fiom of finish disposed on the exposed surface of the buckle front layer. The finished belt has in combination the finished belt strap and the finished belt buckle with the light colors being the same, the dark colors being the same, and the finish colors being the same.

28 Claims, 3 Drawing Sheets

F I G. 1
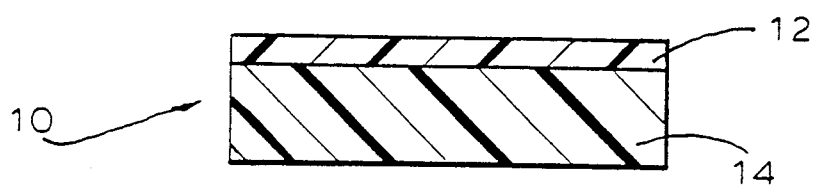
F I G. 2
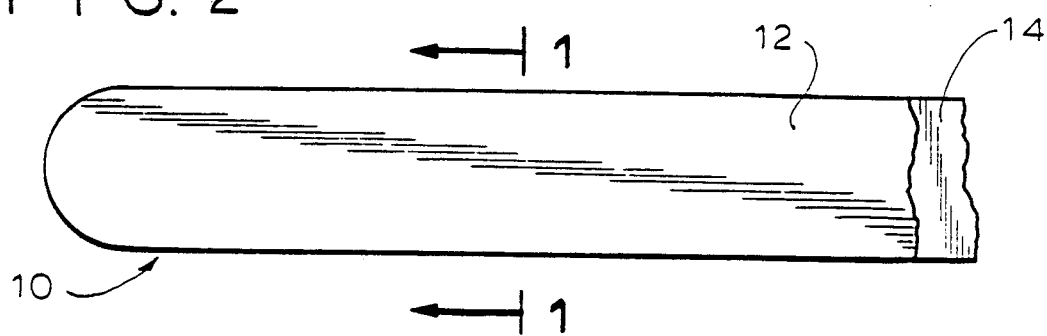
F I G. 3
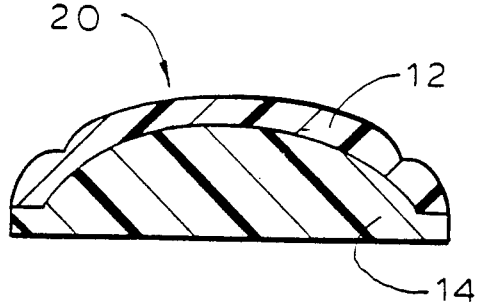
F I G. 4
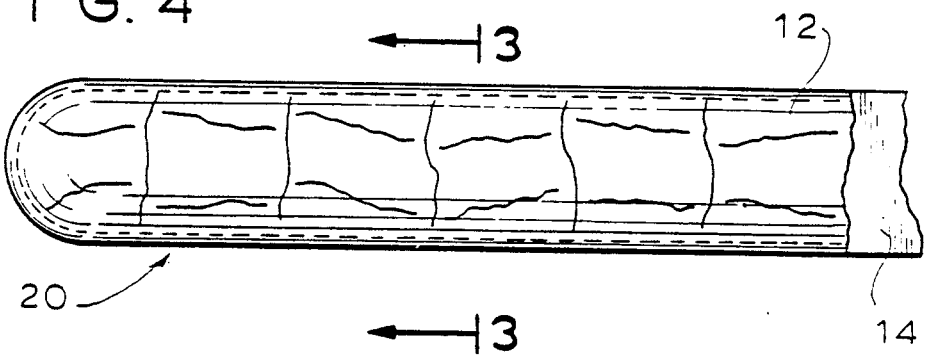

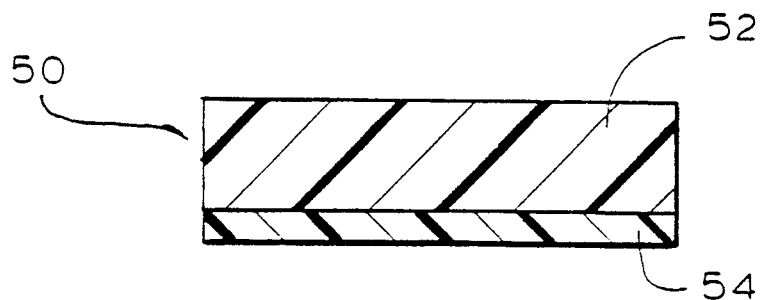
F I G. 9
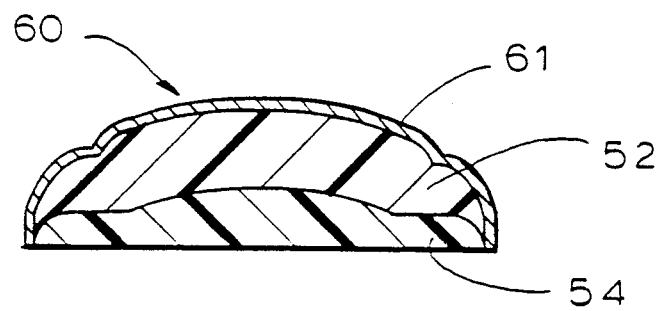
F I G. 10
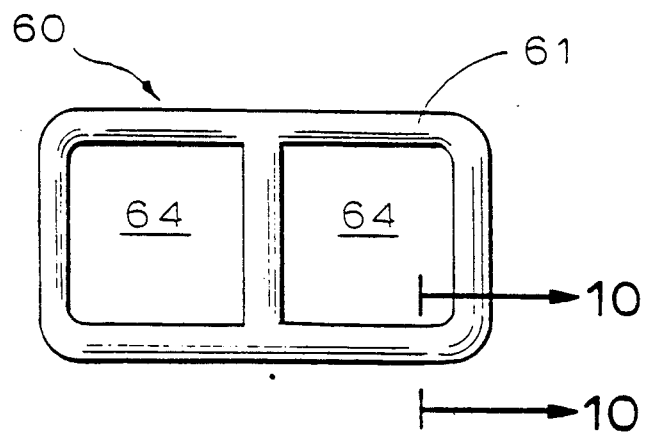
F I G. 11

COEXTRUDED PLASTIC BELT STRAP, BUCKLE AND BELT

CROSS-REFERENCES TO RELATES APPLICATIONS

This is a continuation-in-part of U.S. Pat. No. application Ser. No. 07/464,947, filed Jan. 16, 1990, itself a division of U.S. Pat. application Ser. No. 07/276,677, filed Nov. 28, 1988, now U.S. Pat. No. 4,912,828.

BACKGROUND OF THE INVENTION

The present invention relates generally to finished belts, belt straps and belt buckles and, more particularly, to such belts, straps and buckles which are inexpensively fabricated from plastic and yet simulate expensive leather materials.

U.S. Pat. application Ser. No. 276,677, filed Nov. 28, 1988, now U.S. Pat. No. 4,912,828 (hereinafter the "parent patent"), discloses an all-plastic belt strap which, to a remarkable degree simulates the appearance of an expensive belt strap made of leather at only a slight fraction of the cost. Traditionally, belts have been manufactured utilizing relatively expensive surface materials (such as leather) which were double laminated to a belt filler and belt backing, then cut and sewed by skilled personnel. The manufacturing process often incorporated intensive hand-labor applications, as well as conventional belt-making machinery, to dome, "feather edge," paint sides, punch holes, staple loops and rivet hardware directly to the straps.

The all-plastic belt strap described in the parent patent provides superior aesthetics, dramatically increased production capabilities, impeccable quality standards, and fixed costs independent of the levels of applied labor and/or intricate stitching, expensive reptile or other exotic surface detail, and custom color or style selection, all of which may be faithfully reproduced. Nonetheless, the all-plastic belt strap described in the parent patent has not proven to be entirely satisfactory in use for at least two basic reasons.

First, the finish (i.e., the transparent-colored lacquer or paint) that is applied to the surface of the molded belt strap during the finishing operation is preferably applied to a strap that is substantially lighter in color than the finish. This is necessary in order to contrast the high/low surface relief on the strap by "puddling" the finish into the "valleys" of the relief in order to obtain a darker, more opaque color to contrast with the "hills" of the relief, which typically retain only a thin coat of the transparent finish. The light color (typically bone) bleeds through the thin coating of the finish on the hills and thereby further accents the high/low surface relief. After the strap is finished and the appropriate color achieved, the backing of the belt remains the light base color because it is not covered by the finish. This light color backing of the belt strap is undesirable from an aesthetic point of view, particularly when the finished front or face color is dark (for example, brown or black). In such a case, a dark color backing (for example, brown or black) would be most desirable as it would give the strap a more uniform and realistic leather appearance. Additionally, the presence of a dark color backing would make any embossing (e.g., leather graining) on the backing more discernable.

Second, when holes are punched into the belt strap in order to form the belt holes, the very top surface of the strap defining the belt hole circumference is dark (because of the thin film of special finish thereon), but all of the circumference defining the belt hole therebelow (i.e., from just below the finished top surface to the backing) is of the light color of the base material (e.g., bone). Thus, the appearance of the belt holes lacks an aesthetically satisfying uniformity and is indeed suggestive of an artificial manufacture rather than genuine leather. Preferably substantially the entire surface of the belt strap defining the belt hole should be of a simple color which is generally the same color as the belt backing.

Both of these problems—an undesirable belt backing color and an undesirable punch-hole color—have limited acceptability of the all-plastic belt strap.

Conventionally, belt buckles have been made of a solid metal, wood or plastic covered with either a piece of genuine leather or a synthetic leather such as polyurethane- or polyvinylchloride-coated fabric. The genuine or synthetic leather is stretched over the front or face of a foam of metal, wood or plastic and hand pasted, sewed, and/or crimped around the form. An additional piece of genuine or synthetic leather is typically glued onto the back of the buckle to give it a crushed-leather look. If these buckles are laminated, they tend to delaminate and be easily damaged. From an aesthetic point of view, the genuine or synthetic leather material used to coat the form may so vary from the color of the leather strap that, even when they are both lacquered with the same finish, they fail to match identically, as necessary to provide a desirably uniform finished appearance.

Accordingly, it is an object of the present invention to provide a leather-like all-plastic belt strap having a dark color backing.

Another object is to provide such a belt strap having a substantially uniform belt hole color (that is, substantially the entire surface of the belt strap defining the belt hole is of a single color) which is generally the same color as the belt backing.

A further object is to provide a leather-like plastic belt buckle which does not require lamination, gluing or crimping of a fabric onto a form.

It is also an object of the present invention to provide a belt having such a belt buckle and belt strap with matching colors.

SUMMARY OF THE INVENTION

It has now been found that the above and related objects of the present invention are obtained in a finished belt strap, a finished belt buckle, and a finished belt.

The finished belt strap of the present invention simulates a leather belt strap and comprises a flexible unfinished molded plastic strap for a belt having a thin front layer of light color plastic and a continuous relatively thick back layer of relatively dark color plastic. A film of finish is disposed on the exposed surface of the front layer.

In a preferred embodiment, the front layer is embossed so that at least areas thereof are in relief relative to other areas thereof, the front layer optimally being embossed to a depth less than the thickness thereof. The film is of varying thickness according to the degree of relief of the strap and is applied to the front of the molded plastic strap in a post-molding finishing operation. The film is closer in color to the back layer than the front layer. The molded plastic strap and film together define aligned apertures extending therethrough as belt holes, the surfaces defining the circumferences of the belt holes being of the same color as the back layer substantially throughout.

The plastic strap is a coextrusion of the front and back layers. The front and back layers are preferably polyvinyl chloride or a like plastic. The back layer has a thickness of at least 100 mils, the front layer has a thickness of about 10–30 mils, and the film has a thickness of less than 1 mil. The back layer may additionally define extensions on each longitudinal side thereof extending at least partially over the longitudinal sides of the front layer.

The finished belt buckle of the present invention simulates a leather belt buckle and comprises an unfinished molded plastic buckle for a belt having a thick flexible front layer of light color plastic and a relatively thin rigid back layer of relatively dark color plastic. A film of finish is disposed on the exposed surface of the front layer.

Preferably the buckle back layer has a thickness of about 25 mils, the buckle front layer has a thickness of about 150 mils, and the buckle film has a thickness less than 1 mil. These thicknesses vary, however, based on style requirements.

The finished belt of the present invention simulates a leather belt and comprises in combination the finished belt strap and the finished belt buckle, with the colors of the strap and buckle front layers being the same, the colors of the strap and buckle back layers being the same, and the colors of the strap and buckle film layers being the same.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 1 is a sectional view of the coextrusion for a finished belt strap according to the present invention, taken along the line 1—1 of FIG. 2;

FIG. 2 is a top plan view of the coextrusion;

FIG. 3 is a sectional view of the molded belt strap, taken along the line 3—3 of FIG. 4;

FIG. 4 is a top plan view of the molded belt strap;

FIG. 9 is a sectional view of a coextrusion for a finished belt buckle according to the present invention;

FIG. 10 is a sectional view of the molded and finished belt buckle, taken along the line 10—10 of FIG. 11; and FIG. 11 is a top plan view of the molded and finished belt buckle.

DETAILED DESCRIPTION OF THE PREFERRED EMBODIMENTS

Figure 5:
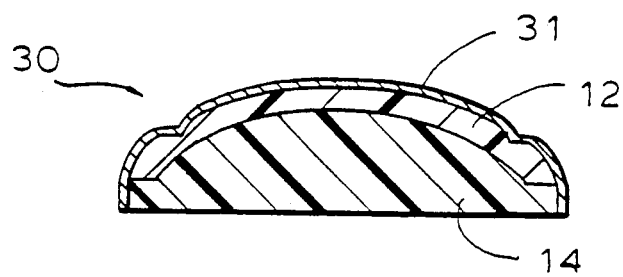
FIG. 5 is a sectional view of the finished belt strap, taken along the line 5—5 of FIG. 6.

As described in the parent patent, an all-plastic belt strap simulating an expensive leather strap may be formed of any thermoplastic material affording the properties considered desirable in a belt, such as high density, hardness, flexibility, thermal sensitivity and tear resistance. A preferred plastic for the material is a modified polyvinyl chloride (PVC), the particular modifiers and the quantities in which they are used being adjusted to provide the aforementioned desirable qualities of the belt strap under the specific conditions of manufacture. The plastic material may be provided as a thin, rectangular sheet from which the pre-molding operation belt straps are precision cut as male portions to fit into the corresponding female mold cavities. Alternatively, the pre-molding operation belt straps may be formed directly by extrusion of the plastic material to the desired thickness, width and shape. Where the profile of the molded belt strap (that is, its cross section) will be relatively flat, the pre-molding operation belt strap is preferably die cut to an appropriate length and width from flat sheet stock, but, where the finished belt is to have a strongly contoured profile, stock having an extruded profile broadly compatible with the width and contour of the intended mold cavity is preferred. As the particulars concerning the belt strap and the method of manufacturing the same are set forth in detail in the aforementioned parent patent, a further exposition thereof is not deemed necessary herein.

Referring now to FIGS. 1 and 2, therein illustrated is a multilayer, all-plastic, pre-molding operation belt strap according to the present invention, generally designated by the reference numeral 10. In contrast to the monolayer, all plastic, pre-molding operation belt strap according to the parent patent, the strap 10 comprises a co-extrusion of a thin plastic front layer 12 of light color (shown on the top in FIG. 1) and a continuous relatively thick plastic back layer 14 of relatively dark color (shown on the bottom in FIG. 1). Preferably the front layer 12 has a thickness of about 10–30 mils, and the back layer 14 has a thickness of at least 100 mils, although clearly other absolute thicknesses may be used for particular applications. The light color of the front layer 12 and the relatively dark color of the back layer 14 are selected to provide the desired visual effect—for example, a bone front layer on a brown or black layer, a powder blue front layer on a navy back layer, a pink front layer on a burgundy back layer, etc. Both the front and back layers 12, 14 are typically of the same basic material, preferably polyvinyl chloride, but may be made of different plastics for particular applications so long as the different plastics are compatible —for example, have compatible coefficients of thermal expansion so that they do not separate under the expected temperature variations during storage and use, etc.

The multilayer pre-molding operation belt strap 10 is preferably formed by a conventional co-extrusion process just as the prior art monolayer pre-molding operation belt strap of the parent patent may be formed by a conventional mono-extrusion process. Accordingly, the multilayer pre-molding operation belt strap 10 may be conveniently co-extruded with a contoured profile suitable for the formation of the belt strap to be molded, thereby reducing the required mold cycle time. The co-extrusion process results in a monolithic, inseparable, multicolor, multilayer belt strap which is much sturdier than conventional belts which are made up of different layers laminated together by glue or stitched together.

Referring now to FIGS. 3 and 4, therein illustrated is the molded belt strap, generally designated 20, produced by placing the pre-molding operation belt strap 10 within the mold cavity (not shown) with the front layer 12 face down into the mold, for example, in the manner disclosed in the parent patent. Because a large percentage of the belt strap 10 is a dark color (typically over 75% and preferably over 90% by volume), the molding process proceeds faster and the design definition is enhanced because the dark color heats up faster and retains its heat longer than would a lighter color material. Thus, heating cycles of about 40 seconds for the molding operation have been found satisfactory, although the time will depend upon many factors, as enumerated in the parent patent. During the molding operation, the front layer 12 is embossed so that at least areas thereof are in relief relative to other areas, the contouring or embossing of the front layer 12 preferably being to a depth of less than the thickness of the front layer.

While it is possible to co-extrude the pre-molding operation belt strap 10 such that the back layer 14 also extends over the longitudinal side edges of the front layer 12 (so that the front layer 12 is in effect deposited within a U-shaped recess of the back layer 14), this is a difficult co-extrusion to obtain. Further, it is typically unnecessary in the present invention. If the pre-molding operation belt strap 10 is undersized relative to the female mold cavity into which it is placed, during the molding process the back layer 14 will, under the molding conditions of heat and pressure, tend to flow between the two longitudinal sidewalls of the female cavity and the two longitudinal side edges of the strap front layer 12, so that the resulting molded belt strap 20 has a very thin layer of the dark color plastic of back layer 14 covering the longitudinal side edges of the light color plastic of front layer 12. The looseness of the pre-molding operation belt strap 10 relative to the mold cavity can be adjusted in order to provide for the desirable thickness of the covering of the front layer longitudinal side edges, a covering of about 15 mils on each longitudinal side edge being satisfactory.

It will be appreciated, however, that, even if the premolding operation belt strap 10 snugly fits within the mold cavity so that the backing layer 14 cannot flow during the molding operation to cover the longitudinal side edges of the front layer 12, theoretically the longitudinal side edges of the front layer 12 will be covered entirely by lacquer during the finishing operation. The problem with relying upon the finishing operation for this function is that any failure of the lacquer to cover the longitudinal side edges of the front layer 12 will result in a finished belt strap having ragged looking longitudinal side edges due to the uneven covering of lacquer and the occasional direct appearance of the light color of the front layer 12.

Figure 6:
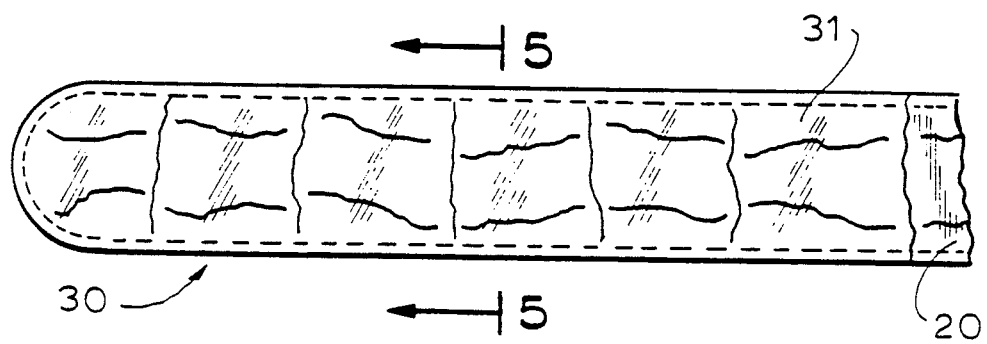
FIG. 6 is a top plan view of the finished belt strap.

Referring now to FIGS. 5 and 6, therein illustrated is a finished belt strap, generally designated 30, produced by finishing the molded belt strap 20 with a thin film 31 of finish (e.g., lacquer, varnish, paint, etc.), for example, in the manner disclosed in the parent patent. The film 31 applied to the front of the molded plastic strap 20 during the post-molding finishing operation is of varying thickness according to the degree of relief of the molded strap 20.

Figure 7:
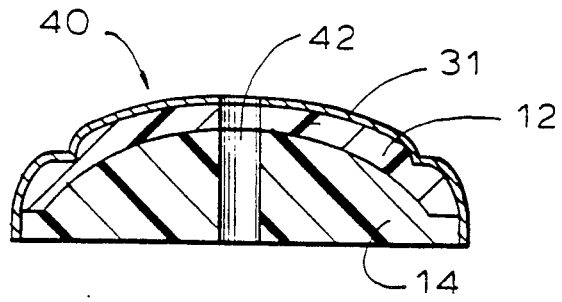
FIG. 7 is a sectional view of the finished belt strap with belt holes punched therein, taken along the line 7—7 of FIG. 8.
Figure 8:
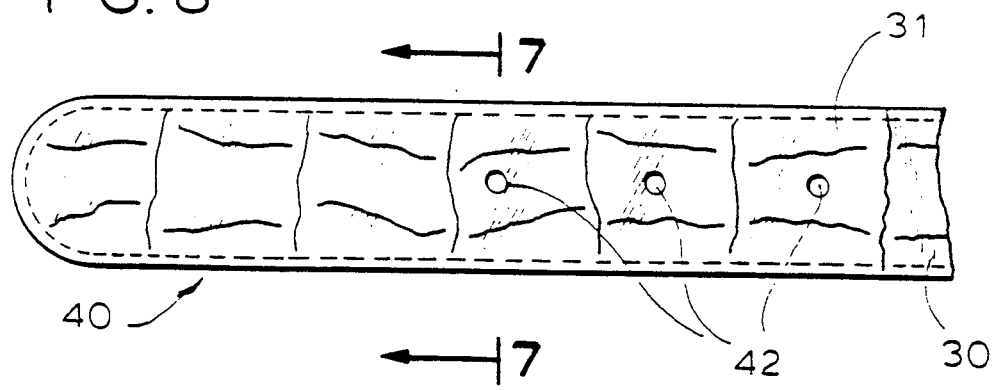
FIG. 8 is a top plan view of the finished belt strap with belt holes punched therein.

Referring now to FIGS. 7 and 8, therein illustrated is a finished belt strap with belt holes, generally designated 40, produced by punching belt holes 42 into the finished belt strap 30, for example, in the manner disclosed in the parent patent. The belt holes 42 extend both through the molded plastic strap 20 and the film 31, defining aligned apertures extending therethrough.

The film 31 of finish disposed on the exposed surface of the front layer 12 (and any exposed front surface of the back layer 14), is typically very thin, thinner than the front layer 12, and preferably less than 1 mil. As the finish is typically of a transparent colored material having a relatively dark color, closer to the dark color of the back layer 14 than the relatively light color of the front layer 12, the belt holes 32 appear to be of substantially uniform dark color, similar to the dark color of film 31 and back layer 14. More particularly, the circumference of each belt strap aperture defining a belt hole 32 includes a relatively dark film of less than 1 mil, a light color front layer 12 of about 10-30 mils, and a relatively dark color back layer of at least 100 mils, the dark colors of the front surface 31, back surface 14 and most of the sidewall therebetween presenting a relatively dark appearance despite the intervening presence of the front layer 12.

The present invention is also directed to a finished belt buckle suitable for use with the finished belt strap 30. Referring now to FIG. 9, therein illustrated is a multilayer, all-plastic, pre-molding operation buckle, generally designated 50, comprising a co-extrusion of a thick, flexible plastic front layer 52 of light color and a relatively thin, rigid plastic back layer 54 of relatively dark color. Thus, the buckle of the present invention, like the strap of the present invention, is a monolithic construction which resists damage and cannot delaminate. The light color plastic of the buckle front layer 52 is preferably the same light color plastic used for the strap front layer 12, and the dark color plastic of the buckle back layer 54 is preferably the same relatively dark color plastic used for the strap back layer 14. If desired, however, different plastics and/or different colors may be used for the buckle 50 and strap 10. The primary difference in basic construction between strap 10 and buckle 50 is that the buckle back layer 54 is made of a relatively thin layer (about 25 mils) of a rigid plastic, such as rigid polyvinyl chloride, whereas the strap back layer 14 is made of a thicker layer of a flexible plastic, such as flexible polyvinyl chloride, and that the buckle front layer 52 is much thicker (about 150 mils) than the strap front layer 12.

As illustrated in FIGS. 10 and 11, the pre-molding operation plastic buckle 50 may be molded and finished in the same manner as the pre-molding operation strap 10 to produce the finished buckle 60. Thus, during the molding operation, the front layer 52 may be embossed so that at least areas thereof are in relief relative to other areas, the embossing preferably being to a depth less than the thickness thereof. The film 61 applied to the molded buckle during the finishing operation to produce the finished buckle 60 is of varying thickness according to the degree of relief of the buckle, the film 61 being closer in color to the buckle back layer 54 than the buckle front layer 52. The buckle back layer 54 may define extensions on each longitudinal side thereof extending at least partially over the longitudinal sides of the buckle front layer 52.

In the finished belt buckle 60, preferably the back layer 54 has a thickness of about 25 mils, the buckle front layer 52 has a thickness of about 150 mils, and the film 61 of finish has a thickness of less than 1 mil. Because this is a belt buckle, rather than a belt strap, there is no need to simulate the appearance of a monolayer material, and the center pieces and edges of the buckle may be die cut to define apertures 64 even though such die cutting reveals a layered arrangement with the layers being of different colors the finish will cover most of the layering. On the other hand, it is important that the top layer 52 of the buckle present a leather-like feel, rather than a rigid plastic feel (which would be aesthetically undesirable), and this leather-like feel is provided by the top layer 52 of the finished buckle, covered only by film 61.

The present invention is also directed to a belt, generally designated 80, formed by assembling together a finished belt strap 40 and a finished belt buckle 60 in the manner disclosed in the parent patent. Preferably the strap and buckle front layers 12, 52 are of the same light color and the strap and buckle back layers 14, 54 are of the same relatively dark color, both the strap 40 and buckle 60 being finished with the identical film 31, 61 of finish in order to provide a belt characterized by an aesthetically desirable uniformity of visible color.

To summarize, the present invention provides a leather-like all-plastic belt strap having a dark color backing and a substantially uniform belt hole color (that is, substantially the entire surface of the belt strap defining the belt hole being of a single color) which is generally the same color as the dark color backing. The present invention further provides a leather-like plastic belt buckle which does not require lamination, gluing or crimping of a fabric onto a form. Finally the present invention provides a belt having such a belt buckle and a belt strap with matching dark colors.

Now that the present invention has been shown and described in detail, various modifications and improvements thereon will become readily apparent to those skilled in the art. Accordingly, the spirit and scope of the present invention is to be limited only by the appended claims, and not by the foregoing disclosure.

We claim:

1. A finished belt strap simulating a leather belt strap comprising
   (A) an unfinished molded plastic strap for a belt, said plastic strap being a coextrusion of a thin front layer of light color plastic and a continuous relatively thick back layer of relatively dark color plastic; and
   (B) a finish disposed on the exposed surface of said front layer of said molded plastic strap.

2. The finished belt strap of claim 1 wherein said front layer is embossed so that at least areas thereof are in relief relative to other areas thereof.

3. The finished belt strap of claim 2 wherein said front layer is embossed to a depth less than the thickness of said front layer.

4. The finished belt strap of claim 2 wherein said finish is of varying thickness according to the degree of relief of said strap.

5. The finished belt strap of claim 1 wherein said finish is applied to the front of said molded plastic strap in a post-molding finishing operation.

6. The finished belt strap of claim 1 wherein said finish is closer in color to said back layer than said front layer.

7. The finished belt strap of claim 1 wherein said molded plastic strap and finish together define aligned apertures extending therethrough as belt holes.

8. The finished belt strap of claim 7 wherein the surfaces defining the circumferences of said belt holes are of the same color as said back layer substantially throughout.

9. The finished belt strap of claim 1 wherein said back layer has a thickness of at least 100 mils, said front layer has a thickness of about 10–30 mils, and said finish has a thickness of less than 1 mil.

10. The finished belt strap of claim 1 wherein said back layer additionally defines extensions on each longitudinal side thereof extending at least partially over the longitudinal sides of said front layer.

11. The finished belt strap of claim 1 wherein said front and back layers are polyvinyl chloride.

12. The finished belt strap of claim 1 wherein said molded plastic strap is flexible.

13. The finish belt strap of claim 1 wherein said finish is disposed only on said front layer and not on the exposed surface of said back layer.

14. A finished belt strap simulating a leather belt strap comprising
   (A) an unfinished flexible molded plastic strap for a belt coextruded with a thin front layer of light color plastic having a thickness of about 10–30 mils and a continuous relatively thick back layer of relatively dark color plastic having a thickness of at least 100 mils; said front layer being embossed to a depth less than the thickness thereof so that at least areas thereof are in relief relative to other areas thereof; and
   (B) a film of finish disposed on the exposed surface of said front layer having a thickness of less than 1 mil, said film being of varying thickness according to the degree of relief of said strap, applied to the front of said molded plastic strap in a post-molding finishing operation, and closer in color to said back layer than said front layer, said molded plastic strap and film together define aligned apertures extending therethrough as belt holes, the surfaces defining the circumferences of said belt holes being of the same color as said back layer substantially throughout.

15. The finished belt strap of claim 14 wherein said back layer additionally defines extensions on each longitudinal side thereof extending at least partially over the longitudinal sides of said front layer.

16. A finished belt buckle simulating a leather belt buckle comprising:
   (A) an unfinished molded plastic buckle for a belt having a thick flexible front layer of light color plastic and a relatively thin rigid back layer of relatively dark color plastic; and
   (B) a film of finish disposed on the exposed surface of said front layer.

17. The finished belt buckle of claim 16 wherein said front layer is embossed so that at least areas thereof are in relief relative to other areas thereof.

18. The finished belt buckle of claim 16 wherein said front layer is embossed to a depth less than its thickness.

19. The finished belt buckle of claim 17 wherein said film is of varying thickness according to the degree of relief of said embracing.

20. The finished belt buckle of claim 16 wherein said film is applied to the front of said molded plastic buckle in a post-molding finishing operation.

21. The finished belt buckle of claim 16 wherein said film is closer in color to said back layer than said front layer.

22. The finished belt buckle of claim 16 wherein said back layer has a thickness of about 25 mils, said front layer has a thickness of about 150 mils, and said film has a thickness less than 1 mil.

23. The finished belt buckle of claim 16 wherein said back layer additionally defines extensions on each longitudinal side thereof extending at least partially over the longitudinal sides of said front layer.

24. The finished belt buckle of claim 16 wherein said plastic strap is a coextrusion of said front and back layers.

25. The finished belt buckle of claim 16 wherein said plastic buckle is polyvinyl chloride.

26. A finished belt buckle simulating a leather belt buckle comprising:
   (A) an unfinished molded plastic buckle for a belt coextruded with a thick flexible front layer of light color plastic having a thickness of about 150 mils and a relatively thin rigid back layer of relatively dark color plastic having a thickness of about 25 mils, said front layer being embossed to a depth less than the thickness of said front layer so that at least areas thereof are in relief relative to other areas thereof; and
   (B) a film of finish disposed on the exposed surface of said front layer having a thickness of less than 1 mil, said film being of varying thickness according to the degree of relief of said strap, applied to the front of said molded plastic strap in a post-molding finishing operation, and closer in color to said back layer than said front layer.

27. The finished belt buckle of claim 26 wherein said back layer additionally defines extensions on each longitudinal side thereof extending at least partially over the longitudinal sides of said front layer.

28. A finished belt simulating a leather belt comprising in combination
   (A) a finished belt strap including
      (i) an unfinished molded plastic strap for a belt having a thin plastic front layer of light color and a continuous relatively thick plastic back layer of relatively dark color; and
      (ii) a film of finish disposed on the exposed surface of said strap front layer; and
   (B) a finished belt buckle including
      (i) an unfinished molded plastic buckle for a belt having a thick flexible plastic front layer of said light color and a relatively thin rigid plastic back layer of said relatively dark color; and
      (ii) a film of said finish disposed on the exposed surface of said buckle front layer.

* * * * *